UNITED STATES PATENT OFFICE.

WILLIAM J. GOLDSWORTHY, OF SAN FRANCISCO, CALIFORNIA.

PREPARATION OF COFFEE.

1,324,662.   Specification of Letters Patent.   Patented Dec. 9, 1919.

No Drawing.   Application filed November 15, 1917. Serial No. 202,120.

*To all whom it may concern:*

Be it known that I, WILLIAM J. GOLDS-WORTHY, a citizen of the United States, residing in the city and county of San Francisco and State of California, have invented a certain new and useful Improvement in the Preparation of Coffee, of which the following is a specification.

The invention relates to the preparing of ground and roasted coffee ready for the making into the coffee beverage, and has for its object the retaining, in the ground and roasted coffee, the strength and aroma thereof, until those qualities are released by infusion at the time the coffee beverage is made.

In carrying the invention into effect the thoroughly dried raw coffee berries are first ground by the ordinary means. The ground product is then packed into and securely inclosed in foraminous containers. The containers are formed from material which is non-combustible and non-soluble to the extent required to keep the containers unimpaired when the coffee therein is roasted or infused. The containers are of a size to hold the proper quantity of ground and roasted coffee for the making of one cup of the coffee beverage. The perforations in the walls of the containers are small enough to prevent the escape of any of the ground coffee from the containers. The filled and closed containers are then placed in a roaster and heated, as in the ordinary manner of roasting coffee berries, until the ground coffee, contained in the containers, is roasted to the proper degree. The containers are then removed from the roaster and cooled. While cooling, a coating of soluble sealing substance is applied to the outside of the containers and, by means of the coating, all perforations and apertures, in the walls of the containers, are hermetically closed. The soluble sealing substance is of such nature as will readily dissolve when a container, coated therewith, is placed in or comes in contact with the hot water at the time the coffee is made. The containers with their contents and coating, being entirely cooled, are then ready for the making of the coffee beverage. By such means and such manner, as described, the strength and aroma of the ground and roasted coffee are retained indefinitely until the making of the coffee beverage.

For the better understanding of the method of preparation, a particular example of its use is now given. Thoroughly dried raw coffee berries are first ground in the ordinary manner. The ground product is then packed into and securely confined in foraminous containers made from thin sheet metal. The perforations in the walls of the containers are of such size as will permanently retain the ground coffee within the containers. The containers are of size to hold the quantity of coffee needed to make one cup of the coffee beverage. The filled and securely closed containers are then placed in a roaster, of the ordinary style, and heated until the ground coffee, within the containers, is roasted to the degree required for the proper making of the coffee beverage. The containers are then removed from the roaster and coated, while being cooled, with a coating of heated gelatin. The coating is applied to the outside of the containers by passing containers through a spray of said coating. The rapid cooling of coating, containers and contents of roasted coffee is effected, while the containers are kept in motion, by blasts or drafts of air, as in the ordinary manner. The coating of gelatin, when applied and cooled, hermetically closes the perforations and apertures of the containers and confines the strength and aroma of the ground and roasted coffee within the containers until those qualities are extracted at the time of and in the making of the coffee beverage.

In making the coffee beverage, a container, prepared in the manner described, being brought into contact with the proper quantity of hot water, the hot water will dissolve the soluble coating of the container and enter through the perforations into the container. The walls of the container, being of non-soluble material, will retain the coffee grounds within the container while the hot water passing freely in and out of container, through the perforations, will extract the qualities of the ground and roasted coffee, as ordinarily effected when the coffee beverage is made by the percolator or strainer processes.

What is claimed as new and what is desired to be secured by Letters Patent is set forth in the appended claims.

I claim:

1. In a process for preparing coffee for the making of the coffee beverage consisting in grinding the raw dried coffee berries, then packing and securely inclosing the ground product in foraminous containers constructed from material which is non-combustible and non-soluble to the extent required to keep the containers unimpaired when the coffee therein is roasted or infused, then subjecting the containers to heat until the coffee therein is properly roasted, then cooling the containers and coating the exterior of the containers while cooling, with a soluble sealing substance thereby hermetically closing the perforations.

2. In a process for preparing coffee for the making of the coffee beverage consisting in roasting ground dried raw coffee while contained in foraminous containers, then coating the containers, after roasting, with a soluble sealing substance thereby hermetically closing the perforations.

3. In a process for preparing coffee for the making of the coffee beverage consisting in roasting ground dried raw coffee while contained in foraminous containers constructed from material which is non-combustible and non-soluble to the extent required to keep the containers unimpaired when the coffee therein is roasted or infused, then coating the containers with a soluble sealing substance thereby closing the perforations.

In testimony whereof I have signed my name to this specification in the presence of two subscribing witnesses on this sixth day of November, 1917.

WILLIAM J. GOLDSWORTHY.

Witnesses:
   W. C. JOHNSON,
   CHAS. CORTRIGHT.